3,084,394
Patented Apr. 9, 1963

3,084,394
METHOD OF MAKING CARBON ARTICLES

Robert Lewis Bickerdike, Farnham, and Garyth Hughes, Aldershot, England, assignors to the Minister of Aviation in Her Majesty's Government of the United Kingdom of Great Britain and Northern Ireland, London, England
No Drawing. Filed Nov. 15, 1960, Ser. No. 69,263
Claims priority, application Great Britain Nov. 20, 1959
8 Claims. (Cl. 18—54.7)

This invention relates to processes of making articles from carbon powder. The term carbon is to be understood to include graphite.

Known processes in the art of making carbon articles include bonding particles of carbon with binders such as synthetic resin or pitch and a subsequent carbonising step.

It has also been proposed to mix carbon powder with the binder to form slugs which are carbonised and pulverised to a finely divided state, the particles resulting being remixed with binder and the product again pulverised to secure a powder of uniform size. In making articles of such powder, charges of the powder are pressed to shape under pressures from 1000 to 20,000 p.s.i. and the product carbonised throughout by heat treatment.

The major disadvantage of the known processes is relatively great irregularity of pore size and distribution with the result that subsequent attempts to deposit carbon in the pores of such articles especially in regions below the surface to reduce or substantially eliminate porosity have been relatively unsuccessful or unduly tedious or expensive.

According to the invention a process of making a carbon article comprises mixing finely divided carbon of very small particle size with a liquid resinous binder, drying the mixture without completely polymerising the binder, pulverising the dried mixture to powder of very small particle size, lightly consolidating in a mould a charge of the mixture powder, polymerising the binder to bond the particles of the charge together, carbonising the bond thereby forming a porous carbon article having pores of substantially uniform distribution and pyrolytically depositing carbon throughout the pores from a carbon-compound gas or vapour.

The resin advantageously forms not more than 15% by weight of the mixture before drying and polymerisation of the resin may be effected by the application of gentle heat at a temperature not exceeding 200° C. The resin is conveniently used in a solvent or diluent.

The use of carbon powder of substantially uniform size is preferred and it has proved advantageous to use powder of which the particle size is not greater than 150 mesh (B.S.S.).

In the pyrolytic deposition step, the gas or vapour is best supplied as a moving stream sweeping through the treatment chamber at a pressure in the range subatmospheric to slightly above atmospheric. The operating temperature during deposition is in the range 500 to 1500° C.

As a general rule the pressure needed to consolidate the charge does not exceed 10 p.s.i. and may be applied by light pressing before or during polymerisation. In many cases consolidation simply by vibration is quite adequate and the selection of the consolidation process depends on the type of mixture-powder used and the desired nature of the final article. The primary consideration is that the consolidating force must not be so high as to severely damage or deform the powder particles or to impose stresses on the article which might produce cracks on removal of the pressure or during heat treatment.

The final step in the process may consist of graphitising the articles by heating them in the usual conditions to a temperature in the range 2000–2800° C.

Several examples of the invention will now be described.

Example 1

125 gm. of pitch coke of particle size less than 300 mesh size (B.S.S.) was mixed with 18.75 gm. of powdered phenolic resin and sufficient isopropyl alcohol as solvent for the resin to form a paste. The paste was poured on to a flat sheet and dried at 60° C. and then pulverised and sieved through a mesh of 150 size (B.S.S.). A charge of the powder of size less than 150 (B.S.S.) was consolidated by vibration in a split graphite mould having a central core (both treated with parting agents) and heated to 170° C. to cure the resin. After cooling, the mould was opened and the core removed and the tubular specimen thus obtained was composed of particles of substantially even size with pores of regular size and evenly distributed throughout. The specimen was heated at 860° C. for 16 hours in a pyrolytic gas deposition furnace in a stream of nitrogen and benzene at a partial pressure of benzene of 8 cm. Hg which increased its bulk density to 0.96 gm./cc. It was then given a further treatment for 48 hours and the surfaces machined. The density was, at this stage, 1.6 gm./cc. and the permeability reduced to a value of the order of $5 \times 10^{-9}$ cms.$^2$/sec.

Example 1 was repeated using a mould of complex shape and the article produced conformed accurately to the mould shape and had density and permeability values similar to those of the article as in the first case.

Example 2

90 parts by weight of petroleum coke was calcined at 1000° C. and crushed to less than 300 mesh (B.S.S.) and then mixed with 10 parts by weight of phenolic resin dissolved in isopropyl alcohol to form a paste. The alcohol was evaporated and the dried paste crushed to powder of less than 300 mesh and a charge of the powder consolidated in a graphite mould by vibration. The charge was then heated to 160° C. to polymerise the resin and bond the powder particles together. The density of the bonded article was 0.75 gm./cc. Specimens were then cut from the article of size 1" x 2" x 0.0625" and subjected to heating at 860° C. first in nitrogen to carbonise the bond and then in a moving stream of benzene (benzene supplied at 50° C.) to deposit carbon in the pores. After 27 hours benzene treatment the density of the specimens was increased to 1.65 gm./cc.

Example 3

The process of making the bonded article was similar to that of Example 2 except that the powder was crushed to less than 150 size mesh (B.S.S.) instead of 300 mesh. After moulding and polymerization, specimens of size 2.375" x 0.375" x 0.375" and 0.375" x 0.3125" x 3.5" were prepared and treated to carbonize the bond and to deposit carbon as in Example 2 with the exception that for the second speciment the benzene was supplied at room temperature. As a result of this treatment the density of the first specimen (benzene supplied at 50° C.) reached 1.73 gm./cc. after 54 hours and that of the second speciment (benzene supplied at room temperature) 1.68 after 140 hours. It will be understood that the effective partial pressure of the hydrocarbon atmosphere around the specimen was higher at the higher temperature of benzene supply.

Example 4

85 parts by weight of petroleum coke calcined at 1350° C. of size less than 300 mesh (B.S.S.) were mixed with 15 parts of phenolic resin in solution in isopropyl alcohol as in Example 2. The majority of the coke particles were smaller than 10 microns. The alcohol was evaporated and the mixture crushed to powder of particle size less than 300 mesh (B.S.S.) and then was found to have only few particles less than 10 microns. Articles were then made of the sieved resin coated powder by consolidating a charge of the powder in a mould and bonding the powder by heating at 170° C. Three sets $a$, $b$ and $c$, of specimens were made from the moulded article of sizes $a$ 0.5" x 1.0" x 1.5" (initial density about 0.7 gm./cc.) and $b$ and $c$ 2.125" diameter x 8.0" in length (initial density 0.80 gm./cc.). The specimens were heated to carbonise the bond and then given a pyrolytic deposition treatment in benzene, specimens of sets $a$ and $b$ at 820° C. and specimen of set $c$ at 860° C., as before, the supply temperature of the benzene being 50° C. The specimens of set $b$ were finally graphitised by heating to 2800° C. for 30 minutes. The benzene treatment raised the density of the specimens to at least 1.77 gm./cc. In the case of specimens of set $c$ the variations in local density were also measured after the final treatment and measurements in local regions were found to be about 1.58 gm./cc. at the centre, about 1.73 gm./cc. at the surface and about 1.61 gm./cc. and 1.65 gm./cc. in adjacent intermediate regions. This demonstrates the effectiveness of the process in improving the whole structure of the article. It is to be noted that the operating temperature of 860° C. used in treating the specimens of set $c$ is higher than is desirable for specimens of such dimension and that the variation of local density would be less at a lower temperature.

*Example 5*

Specimens were made according to Example 4 using a deposition temperature of 860° C. Part way through the treatment the specimens were cut roughly to the shape of mechanical test bars 4" x 0.25" x 0.25" and deposition treatment continued until each bar reached the required density. Before finally grinding to size, some of the bars were graphitised. The results were as follows:

| Specimen Condition | Density, gm./cc. | Young's Modulus, p.s.i.×10^6 | Bond Strength, p.s.i. | Compression Strength, p.s.i. |
| --- | --- | --- | --- | --- |
| as deposited | 1.77 | 2.60 | 9,530 | |
| | 1.77 | 2.65 | 10,710 | |
| | 1.78 | 3.12 | 10,400 | 38,140 |
| | 1.77 | | 7,810 | 36,670 |
| | 1.77 | | 9,630 | |
| | 1.77 | | 10,170 | |
| as deposited | 1.80 | | 14,860 | |
| | 1.77 | | 13,890 | 57,810 |
| | 1.77 | | 16,110 | 58,860 |
| | 1.76 | | 14,040 | 53,810 |
| | 1.75 | | 13,730 | 54,950 |
| after heating at 2,800° C. for 30 minutes. | 1.82 | 1.92 | 12,200 | 35,900 |
| | 1.81 | 2.51 | 11,300 | 38,040 |
| | 1.77 | 2.28 | 13,990 | 24,660 |
| | 1.81 | 2.04 | 12,230 | 48,280 |
| | 1.79 | 2.37 | 8,824 | 36,270 |

By comparison with the above results, it should be noted that commonly accepted typical strength figures for known carbon materials are bond strength about 4000 p.s.i. and compression strength about 8000 p.s.i.

It is believed that the essential improvement resulting from the process of the invention lies in the steps of carefully selecting the carbon powder, making a resinated powder mixture with a low resin content, and only lightly consolidating the charge before the polymerising and carbon depositing steps. The structure of the articles of the new process has the following characteristics. The structure before carbon deposition consists of randomly and evenly distributed particles of very small size which are lightly bonded together by a carbon bond derived from the resin and between the particles there are pores which are of similar size to the particles and are evenly distributed through which the carbon compound gas or vapour may diffuse freely. During deposition the deposited carbon is laid down on each particle as a skin which gradually increases in thickness and is composed of crystallities whose planes lie approximately parallel with the surface of each particle thus presenting a smooth outer surface constituting a part of the wall of a pore in the article. The gas or vapour continues to diffuse readily in these smooth walled pores and deposition proceeds throughout the articles. By comparison, in known carbon materials the carbon particles and pores between them are invariably orientated and also usually elongated as a result of the large pressures applied during manufacture and as a result the structure has mechanical weakness, anisotropic properties, scatter in mechanical properties, a wide range of pore size in relation to adjacent pores and wide variation of pore size with the size of the article.

It is to be noted that the invention permits the manufacture of articles of relatively complex shape and the process ensures that at an intermediate stage the article has uniform pore structure throughout which is the best structure in which to deposit carbon for the purposes of increasing its density and strength and rendering the article substantially impermeable throughout.

In the foregoing specification and in the claims which follow, the term "drying," is to be understood to refer to the removal or evaporation of a solvent or diluent from the resinous binder.

We claim:

1. A process for producing a carbon article of high density comprising mixing finely divided carbon powder having a particle size less than 300 mesh with a polymerizable liquid resin binder, drying the formed mixture sufficient to remove the liquid therefrom but insufficient to effect a complete polymerization of the resin, pulverizing the dried mixture to a finely divided state having a particle size less than 300 mesh, charging mould means with said pulverized dried mixture, heating said mould means to a temperature sufficient to effect a polymerization of the resin and to produce a unitary, formed, carbon article, subjecting said formed carbon article to an elevated temperature sufficient to effect a carbonization thereof to produce a unitary, porous carbon article having pores of similar size to the particles uniformly distributed throughout, contacting the carbonized article with a moving stream of carbon-depositing gas at a temperature in the range 500–1500° C. and a pressure in the range sub-atmospheric to just above atmospheric to deposit carbon throughout said pores thereby producing a unitary, formed, carbon article of high density.

2. A process for producing a carbon article of high density comprising mixing finely divided carbon powder having a particle size less than 300 mesh with a polymerizable liquid resin binder solution having a resin content not in excess of 15% by weight of the formed mixture, drying the formed mixture sufficient to remove the liquid therefrom but insufficient to effect a complete polymerization of the resin, pulverizing the dried mixture to a finely divided state having a particle size less than 300 mesh, charging mould means with said pulverized dried mixture, heating said mould means at a temperature not in excess of 200° C. to effect a polymerization of the resin and to produce a unitary, formed, carbon article, subjecting said formed carbon article to an elevated temperature sufficient to effect a carbonization thereof to produce a unitary, porous carbon article having pores of similar size to the particles uniformly distributed throughout, contacting the carbonized article with a moving stream of a carbon-depositing gas at a temperature in the range 500–1500° C. and a pressure in the range sub-atmospheric to just above atmospheric to deposit carbon throughout said pores thereby producing a formed, unitary, carbon article of high density.

3. A process in accordance with claim 1 wherein the particle size of the original carbon powder is not in excess of 150 mesh.

4. A process in accordance with claim 2 wherein the particle size of the original carbon powder is not in excess of 150 mesh.

5. A process in accordance with claim 1 wherein means are applied to effect a consolidation under light pressure of the charged carbon powder within the mould means whereby pore spaces between the carbon particles are preserved prior to heating same.

6. A process in accordance with claim 1, wherein pressure not in excess of 10 p.s.i. is applied to the carbon powder charge in the mould to effect a consolidation of the powder.

7. A process for producing a carbon article of high density comprising mixing finely divided carbon powder having a particle size less than 300 mesh with a polymerizable liquid resin binder solution, drying the formed mixture sufficient to remove the liquid therefrom but insufficient to effect a complete polymerization of the resin, pulverizing the dried mixture to a finely divided state having a particle size not in excess of 150 mesh, charging mould means with said pulverized dried powder, heating said mould means to a temperature sufficient to effect a polymerization of the resin and to produce a unitary, formed, carbon article, subjecting said formed carbon article to an elevated temperature sufficient to effect a carbonization thereof to produce a unitary, porous carbon article having pores of similar size to the particles uniformly distributed throughout, contacting the carbonized article with a moving stream of a carbon-depositing gas at a temperature in the range 500–1500° C. and a pressure in the range sub-atmospheric to just above atmospheric to deposit carbon throughout said pores thereby producing a formed, unitary, carbon article of high density.

8. A process for producing a carbon article of high density comprising mixing finely divided carbon powder of very small particle size with a polymerizable liquid resin binder, drying the formed mixture sufficient to remove the liquid therefrom but insufficient to effect a complete polymerization of the resin, pulverizing the dried mixture to a finely divided state of very small particle size, charging mould means with said pulverized dried mixture, heating said mould means to a temperature sufficient to effect a polymerization of the resin and to produce a unitary, formed carbon article, subjecting said formed carbon article to an elevated temperature sufficient to effect a carbonization thereof to produce a unitary, porous carbon article having pores of similar size to the particles uniformly distributed throughout, contacting the carbonized article with a moving stream of carbon-depositing gas at a temperature in the range 500°–1500° C. and a pressure in the range sub-atmospheric to just above atmospheric to deposit carbon throughout said pores thereby producing a unitary, formed carbon article of high density.

References Cited in the file of this patent

UNITED STATES PATENTS

| 2,392,682 | Marek | Jan. 8, 1946 |
| 2,719,779 | Bray et al. | Oct. 4, 1955 |

FOREIGN PATENTS

| 550,379 | Great Britain | Jan. 5, 1943 |